(12) United States Patent
Chang

(10) Patent No.: US 8,169,564 B2
(45) Date of Patent: May 1, 2012

(54) DISPLAY MODULE

(75) Inventor: Chin-Hsien Chang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 434 days.

(21) Appl. No.: 12/430,906

(22) Filed: Apr. 28, 2009

(65) Prior Publication Data

US 2010/0141863 A1 Jun. 10, 2010

(30) Foreign Application Priority Data

Dec. 5, 2008 (TW) ................................ 97147408 A

(51) Int. Cl.
*G02F 1/1333* (2006.01)
(52) U.S. Cl. ........................................................ 349/58
(58) Field of Classification Search ...................... 349/58
See application file for complete search history.

(56) References Cited

U.S. PATENT DOCUMENTS

| | | | |
|---|---|---|---|
| 6,002,457 A | 12/1999 | Yun et al. | |
| 6,525,790 B1 * | 2/2003 | Kan-o | 349/58 |
| 7,274,560 B2 * | 9/2007 | Jeong et al. | 361/679.27 |
| 2003/0122995 A1 * | 7/2003 | Park et al. | 349/58 |
| 2003/0147023 A1 * | 8/2003 | Kang et al. | 349/58 |
| 2004/0120104 A1 * | 6/2004 | Jeong et al. | 361/681 |
| 2005/0062900 A1 * | 3/2005 | Kim | 349/58 |
| 2005/0206799 A1 * | 9/2005 | Li et al. | 349/58 |
| 2006/0033858 A1 * | 2/2006 | Liao et al. | 349/58 |
| 2006/0055839 A1 * | 3/2006 | Hirao et al. | 349/58 |
| 2007/0263347 A1 * | 11/2007 | Hong et al. | 361/681 |

FOREIGN PATENT DOCUMENTS

| GB | 2358950 | 8/2001 |
|---|---|---|
| TW | I289227 | 11/2007 |

OTHER PUBLICATIONS

"First Office Action of China Counterpart Application", issued on Jun. 9, 2011, p. 1-p. 5.

* cited by examiner

*Primary Examiner* — Sung Pak
(74) *Attorney, Agent, or Firm* — Jianq Chyun IP Office

(57) ABSTRACT

A display module including a display panel, a frame and a bracket is provided. The frame surrounds the display panel and has a protruding part and a first position limiting structure. The bracket has a body with a second position limiting structure and a first protrusion, wherein the protruding part is aligned with the first protrusion when the first position limiting structure is engaged with the second position limiting structure to fix the bracket on the frame in a non-screw manner.

14 Claims, 4 Drawing Sheets

DISPLAY MODULE

CROSS-REFERENCE TO RELATED APPLICATION

This application claims the priority benefit of Taiwan application serial No. 97147408, filed on Dec. 5, 2008. The entirety of the above-mentioned patent application is hereby incorporated by reference herein and made a part of this specification.

BACKGROUND OF THE INVENTION

1. Field of the Invention

The present invention generally relates to a display module, and more particularly, to the display module provided with a position limiting structure.

2. Description of Related Art

With the development of electro-optical technique and semiconductor technique, various flat display panels (FDP), such as liquid crystal displays (LCDs), plasma display panels (PDPs) or organic electro-luminescent (OEL) devices have become necessaries on our daily life.

To the design requirement of thinness, the display panel usually being fixed in a manner of side mounting. More specifically, after a frame is disposed on the display panel, the frame and the display panel are fixed with each other transversely via a fastener such as a screw.

However, in the manufacturing of the display panel, unpreventable tolerances are exist in the size of the display panel and other assembly elements. In respect of the length of the display panel, the manufacturing tolerance may come to 0.5 millimeter. As regards to the assembly elements, manufacturing tolerances are usually caused by plastic injection molding process, which may lead to misalignment of assembly holes due to difference in dimension thereof.

The aforementioned manufacturing tolerance results in failure of performing one-time screw when applying the fastener. Instead, several steps of screwing are adopted to fasten the fasteners at two opposite sides of the display panel for fixing the display panel and the assembly elements. The repeated screwing action generates inconvenience in assembly, prolongs working hours and affects the productive yields. Furthermore, the complicated assembly process may also lead to defectives and thereby increase the manufacturing cost.

Another conventional manner of assembly is performed by adhesive, which causes long working hours and the adhesive can not be repeatedly used. When an error occurs in the assembly process, the adhesive should be removed destructively to perform reproduction, which may result in not only residual of adhesive but also damage of the display panel.

Accordingly, the reduction in use of the fastener and simplification of assembly process are main subjects in development of the relevant technique fields to achieve the requirements of lightness and thinness of the display module.

SUMMARY OF THE INVENTION

Accordingly, the present invention is directed to a display module with position limiting structure, which improves convenience in assembly.

As embodied and broadly described herein, the present invention provides a display module including a display panel, a frame and a bracket. The frame surrounds the display panel and has a protruding part and a first position limiting structure. The bracket has a body with a second position limiting structure and a first protrusion, wherein the protruding part is aligned with the first protrusion when the first position limiting structure is engaged with the second position limiting structure to fix the bracket on the frame in a non-screw manner.

According to an embodiment of the present invention, the frame further has a third position limiting structure and a plurality of side walls, and the bracket has a fourth position limiting structure.

According to an embodiment of the present invention, the side wall on which the first position limiting structure is located is perpendicular to the side wall on which the third position limiting structure is located.

According to an embodiment of the present invention, the third position limiting structure is located on the protruding part.

According to an embodiment of the present invention, the first protrusion is perpendicular to the body.

According to an embodiment of the present invention, the first position limiting structure is a hole or a cavity, and the second position limiting structure is a bump or a pillar.

According to an embodiment of the present invention, the first position limiting structure is a bump or a pillar, and the third position limiting structure is a hole or a cavity.

According to an embodiment of the present invention, the third position limiting structure is a spring, and the fourth position limiting structure is an opening.

According to an embodiment of the present invention, the third position limiting structure is an opening, and the fourth position limiting structure is a spring.

According to an embodiment of the present invention, the protruding part and the first protrusion are aligned and fixed to a back bezel by a fasten penetrating the protruding part and the first protrusion for fixing the display panel on the back bezel.

According to an embodiment of the present invention, the bracket has a second protrusion perpendicular to the body.

According to an embodiment of the present invention, the second protrusion has a fifth position limiting structure and the back bezel has a sixth position limiting structure. The movement of the display panel relative to the back bezel is restricted by the coupling of the fifth position limiting structure and the second position limiting structure.

According to an embodiment of the present invention, the material of the back bezel comprises plastic.

According to an embodiment of the present invention, the material of the back bezel comprises metal.

According to an embodiment of the present invention, the display module further comprises a backlight module disposed between the frame and the back bezel.

According to an embodiment of the present invention, the display panel is a liquid crystal display panel.

The display module of the present invention has a position limiting structure, by which the structural strength of the display module is improved. Also, there needs no screws or adhesives in the assembly of the bracket and the frame, and thus the number of required elements can be reduced, the assembly process can be simplified and the display module can be minimized to achieve the market requirements of cost reduction and thinness.

BRIEF DESCRIPTION OF THE DRAWINGS

The accompanying drawings are included to provide a further understanding of the invention, and are incorporated in and constitute a part of this specification. The drawings

DESCRIPTION OF THE EMBODIMENTS

Figure 1:
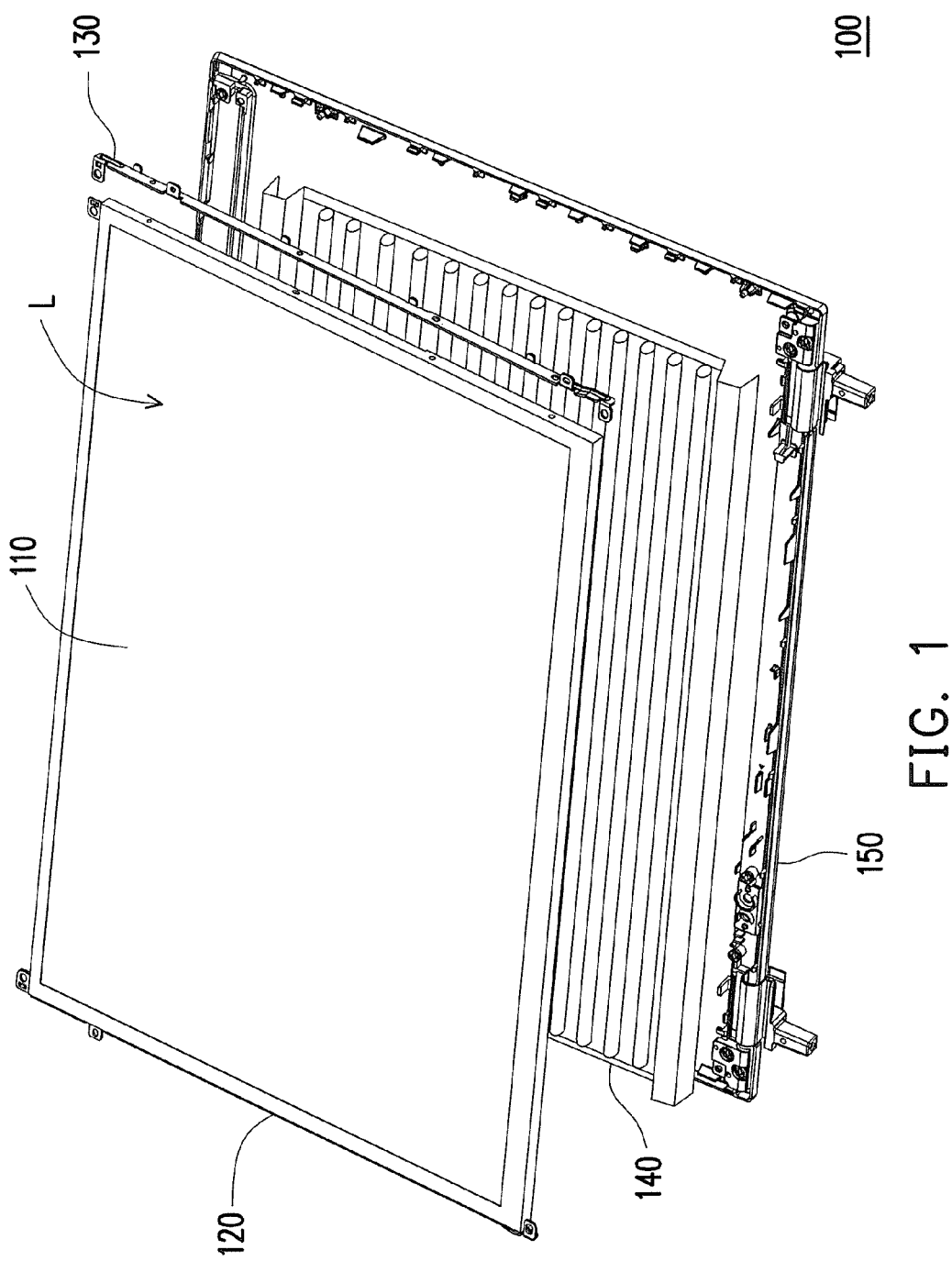
FIG. 1 is a perspective view of a display module according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
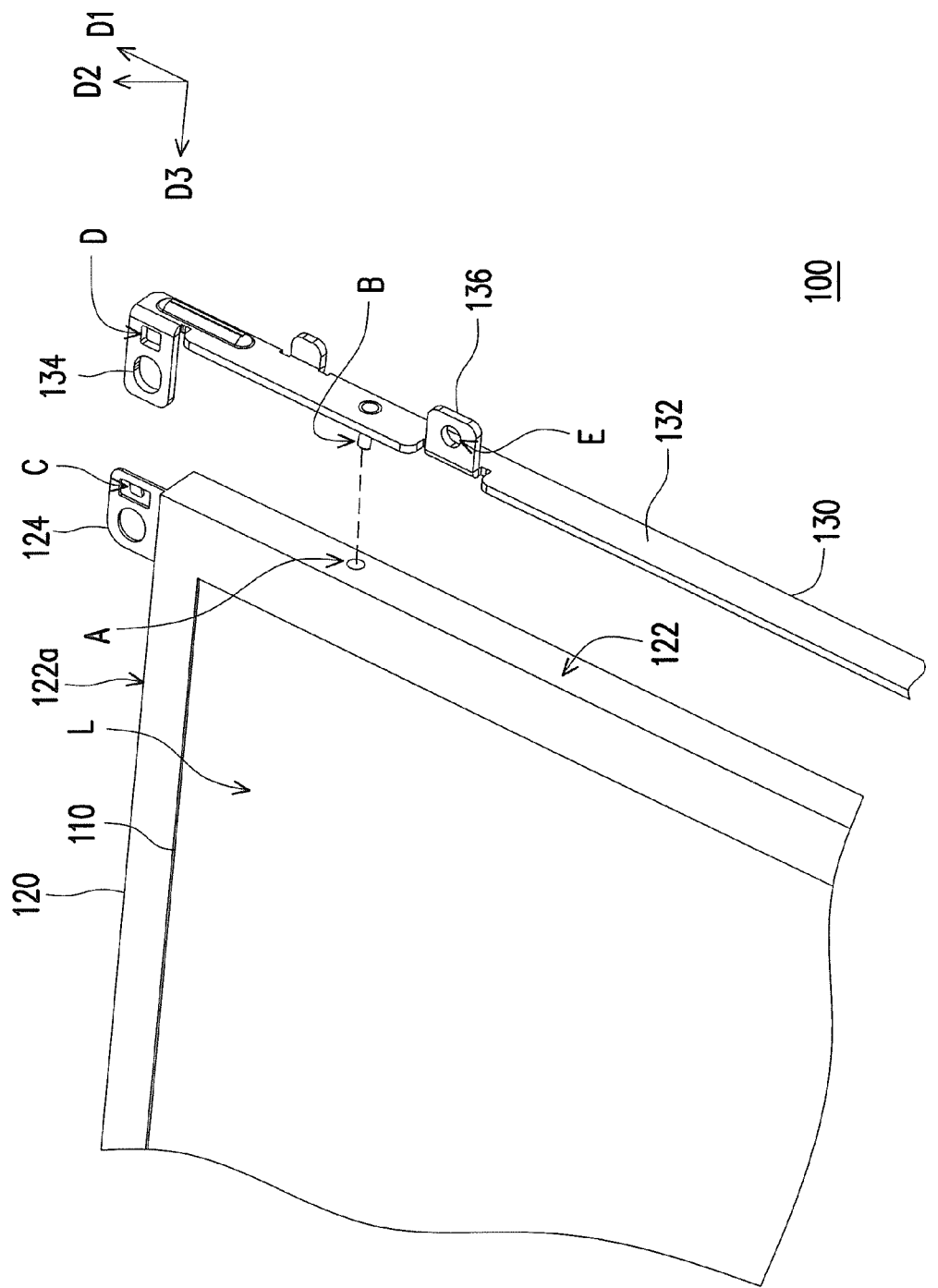
FIG. 2 is a partial view of the display module as illustrated in FIG. 1.

FIG. 1 is a perspective view of a display module according to an embodiment of the present invention. FIG. 2 is a partial view of the display module as illustrated in FIG. 1. Referring to FIG. 1 and FIG. 2, the display module 100 comprises a display panel 110, a frame 120 and a bracket 130. The display panel 110 has a display surface L.

The frame 120 surrounds the display panel 110. The frame 120 has a protruding part 124 and a first position limiting structure A, wherein the first position limiting structure A can be a hole or a cavity. In addition, the material of the frame 120 of the present embodiment includes metal, in which the aluminum with superior ductility, good strength and light weight are usually selected as the material of the frame to reduce the weight of the display module 100. Although the frame made of aluminum is taken as an example herein, it provides no limitation to the scope of the present invention. Materials such as metal or copper with good ductility, high strength and light weight are allowed to form the frame.

The bracket 130 plays the role of supporting structure for enhancing the strength of the display panel 110. The bracket 130 formed by folding and punching a plate has a body 132 and a first protrusion 134 extending from the body 132. The first protrusion 134 is perpendicular to the body 132 and the body 132 has a second position limiting structure B. The second position limiting structure B can be a pillar, a bump or a spring, in a shape complementary to the first position limiting structure A. Although the second position limiting structure B is a pillar in the figures, it provides no limitation to the scope of the present invention. The protruding part 124 is aligned with the first protrusion 134 when the first position limiting structure A is engaged with the second position limiting structure B to fix the bracket 130 on the frame 120 in a non-screw manner. As shown in FIG. 2, in this embodiment, the frame 120 further has a third position limiting structure C and a plurality of side walls 122 and 122a, wherein the protruding part 124 extends from the side wall 122a and the third position limiting structure C is located on the protruding part 124. The third position limiting structure C is a spring. It is noted that the first position limiting structure A and the third position limiting structure C are respectively disposed on different side walls 122 and 122a. The two side walls 122 and 122a are perpendicular to each other to make the bracket 130 being engaged with the frame 120 in space.

Moreover, the bracket 130 further has a fourth position limiting structure D, which is an opening, disposed on the first protrusion 134. When the protruding part 124 is aligned with the first protrusion 134, the third position limiting structure C is pressed into the fourth position limiting structure D, by which the bracket 130 is fixed on the frame 120. On the other hand, in order to align the first protrusion 134 and the protruding part 124 when the bracket 130 is fixed on the frame 120, the first protrusion 134 is designed to be perpendicular to the body 132 to fit the protruding part 124 extending from the side wall 122a.

In this embodiment, the process of assembling the bracket 130 with the frame 120 is as follows. First, the bracket 130 is assembled to the frame 120 along a third direction D3, wherein the first protrusion 134 is aligned with the protruding part 124 partially. The second position limiting structure B is coupled to the first position limiting structure A along the third direction D3, wherein movements of the bracket 130 along a first direction D1 and a second direction D2 are restricted by the fitting of shape and dimensions between the second position limiting structure B and the first position limiting structure A.

At the same time, the first protrusion 134 move along a surface of the protruding part 124, and when the third position limiting structure C is aligned with the fourth position limiting structure D, the third position limiting structure C is engaged with the fourth position limiting structure D and leans against the fourth position limiting structure D to restrict the movement of the bracket 130 along the third direction D3. The plane defined by the first direction D1 and the third direction D3 is parallel to the display surface L, and the second direction D2 is orthogonal to the display surface L.

The display panel 110 can be fixed to the bracket 130 via the frame 120 by the aforementioned position limiting structures and there by restrict the relative movement between the display panel 110 and the bracket 130.

The above first position limiting structure A being as a hole or a cavity, and the second position limiting structure B being as a pillar or a bump are exemplary cases of this embodiment and doesn't limit the scope of the present invention. In another embodiment, the first position limiting structure A can also be a pillar or a bump, and the second position limiting structure B can further be a hole or a cavity. However, the profiles of the above third position limiting structure C and the fourth position limiting structure D can also be modified by those skilled in the field according to any probable requirements obviously. For example, the third position limiting structure C can be an opening, and the fourth position limiting structure D can be a spring.

Referring to FIG. 1, the display module 100 further comprises a backlight module 140 disposed between the display panel 110 and the back bezel 150 and surrounded by the frame 120. The backlight module 140 is assembled with the display panel 110 via the frame 120. The backlight module 140 of the embodiment is a direct-type backlight module providing sufficient illumination to the display panel 110. In another embodiment, the backlight module 140 can also be a side-type backlight module.

Figure 3:
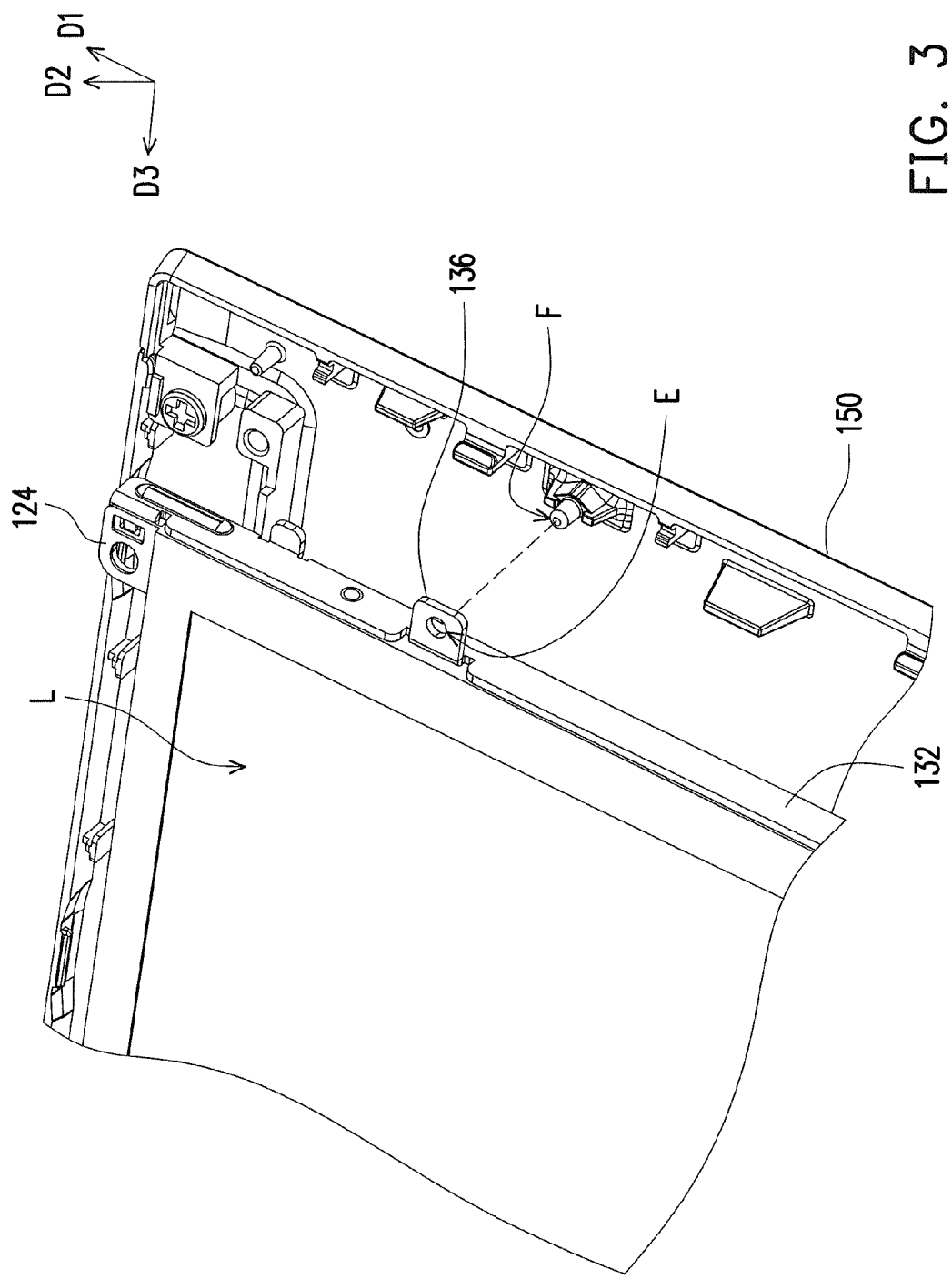
FIG. 3 is a partial view of the display module as illustrated in FIG. 1.

FIG. 3 is a partial view of the display module as illustrated in FIG. 1. Referring to FIG. 1 and FIG. 3, the display module 100 further comprises a back bezel 150 disposed at another side of the display panel 110 in opposite to the display surface L. The back bezel 150 can be integrally formed from plastic or metal. The back bezel 150 is used for carrying the display panel 110, the frame 120, the bracket 130 and the backlight module 140. Furthermore, the bracket 130 has a plurality of second protrusions 136 respectively perpendicular to the body 132 and extending along a direction departing from the display panel 110.

In an embodiment, when the first protrusion 134 is aligned with the protruding part 124 and the bracket 130 is fixed on the frame 120, the display panel 110 is fixed on the back bezel 150a by a fastener (not shown) penetration the first protrusion 134 and the protruding part 124. In another embodiment, when the display panel 110 and the backlight module 150 are assembled with the frame 120 and coupled to the bracket 130, the fifth position limiting structure E moves downward along the second direction D2 to engage the sixth position limiting structure F into the fifth position limiting structure E. The movements of the back bezel 150 along the first direction D1 and the third direction D3 can be restricted by the engagement between the fifth position limiting structure E of the second protrusion 136 and the sixth position limiting structure F of the back bezel 150, and thereby the back bezel 150 can be located and assembled with the display panel 110 via the bracket 130. In this embodiment, the fifth position limiting structure E can be an opening, and the sixth position limiting structure F can be a pillar. In further another embodiment, the fifth position limiting structure E can be a pillar, ad the sixth position limiting structure F can be an opening. After that, a front bezel (not shown) is assembled with the back bezel 150 to substantially complete the assembly of the display module 100. In this embodiment, the fifth position limiting structure E can be an opening, and the sixth position limiting structure F can be a hollow pillar. The display panel 110 can be fixed with the back bezel 150 by penetrating a fastener (not shown) through the fifth position limiting structure E and inserting the fastener into the sixth position limiting structure F when the fifth position limiting structure E is coupled with the sixth position limiting structure F.

Figure 4:
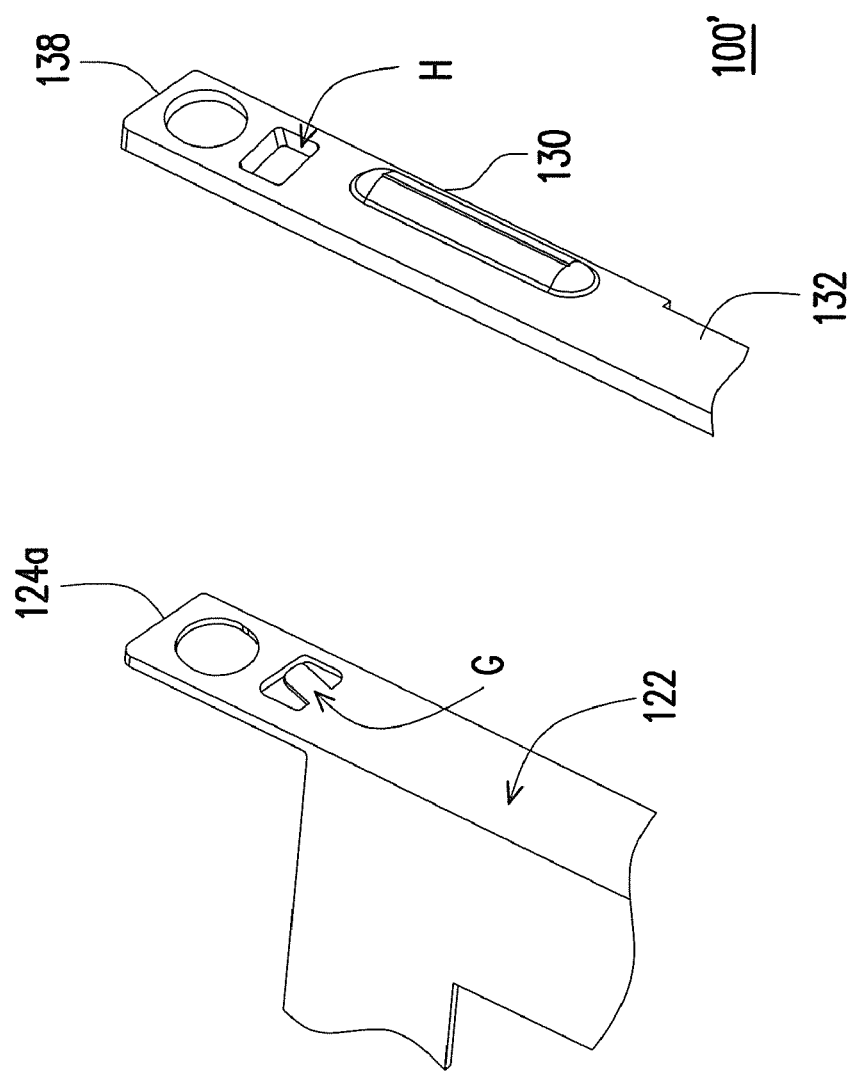
FIG. 4 is a partial view of a display module according to another embodiment of the present invention.

FIG. 4 is a partial view of a display module according to another embodiment of the present invention. Referring to FIG. 4, in different to the aforementioned embodiment, a third protrusion 138 of the bracket 130 extends from the body 132 and parallel thereto. In addition, a protruding part 124a is located on the side wall 122 corresponding to the third protrusion 138. The protruding part 124a is parallel to the third protrusion 138. A seventh position limiting structure G on the protruding part 124a extends towards the bracket 130. The seventh position limiting structure G is a spring. An eighth position limiting structure H on the third protrusion 138 corresponding to the seventh position limiting structure G is an opening. According to various designs of products, a bracket provided with the third protrusion 138 as shown in FIG. 4 may further has the second protrusion 136 as shown in FIG. 2 to fix a display module on a back bezel, and the second protrusion 136 is perpendicular to the third protrusion 138.

When the bracket 130 is coupled to the frame 120, the third protrusion 138 is aligned with the protruding part 124a partially. The seventh position limiting structure G of the protruding part 124a is pressed and engaged with the eighth position limiting structure H of the third protrusion 138 so that the frame 120 and the bracket 130 can be coupled tightly and thereby the movement of the bracket 130 along the third direction D3 (as shown in FIG. 3) Is restricted.

In summary, the present invention provides a display module with position limiting structures, wherein the display panel and the backlight module are assembled and located with each other by the position limiting structures on the frame and the bracket. In addition, the assembly process of the display module requires no additional fastener which occupies available space, so as to reduce the production cost and simplify the assembly process. The thinness of the display module can also be achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display module, comprising:
a display panel;
a frame surrounding the display panel and having an ear, a first position limiting structure, a third position limiting structure and a plurality of side walls, wherein the side wall on which the first position limiting structure is located is perpendicular to the side wall on which the third position limiting structure is located; and
a bracket having a body, a first protrusion and a fourth position limiting structure, wherein the body has a second position limiting structure, and the ear is aligned with the first protrusion when the first position limiting structure is engaged with the second position limiting structure to fix the bracket on the frame in a non-lock manner.

2. The display module according to claim 1, wherein the third position limiting structure is located on the ear.

3. The display module according to claim 1, wherein the first protrusion is perpendicular to the body.

4. The display module according to claim 1, wherein the first position limiting structure is a hole or a cavity, and the second position limiting structure is a bump or a pillar.

5. The display module according to claim 1, wherein the first position limiting structure is a bump or a pillar, and the third position limiting structure is a hole or a cavity.

6. The display module according to claim 1, wherein the third position limiting structure is a spring, and the fourth position limiting structure is an opening.

7. The display module according to claim 1, wherein the third position limiting structure is an opening, and the fourth position limiting structure is a spring.

8. The display module according to claim 1, further comprising a back bezel.

9. The display module according to claim 8, wherein the ear and the first protrusion are aligned and fixed to the back bezel by a fasten penetrating the ear and the first protrusion for fixing the display panel on the back bezel.

10. The display module according to claim 8, wherein the bracket has a second protrusion perpendicular to the body and fixed to the back bezel by a fastener penetrating the second protrusion for fixing the display panel on the back bezel.

11. The display module according to claim 8, wherein the material of the back bezel comprises plastic.

12. The display module according to claim 8, wherein the material of the back bezel comprises metal.

13. The display module according to claim 8, further comprising a backlight module disposed between the frame and the back bezel.

14. The display module according to claim 1, wherein the display panel is a liquid crystal display panel.

* * * * *